April 11, 1950 — C. N. HICKMAN — 2,503,271
ROCKET PROJECTILE
Filed Feb. 6, 1945 — 2 Sheets-Sheet 1
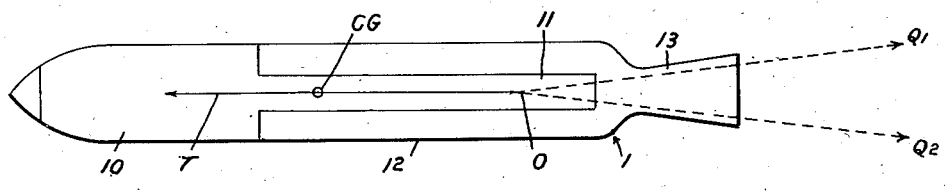
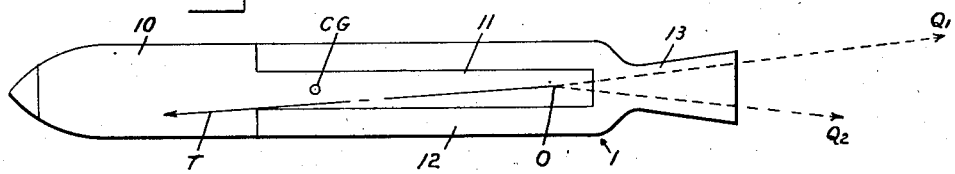
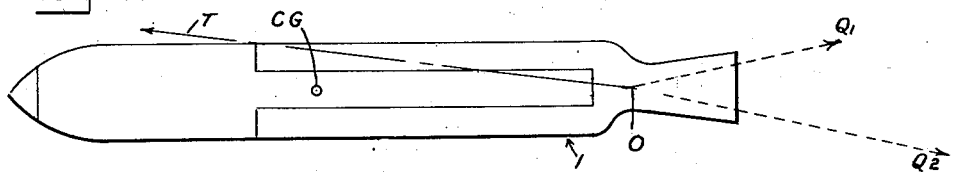
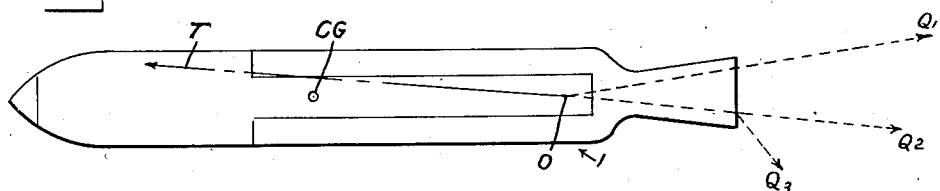
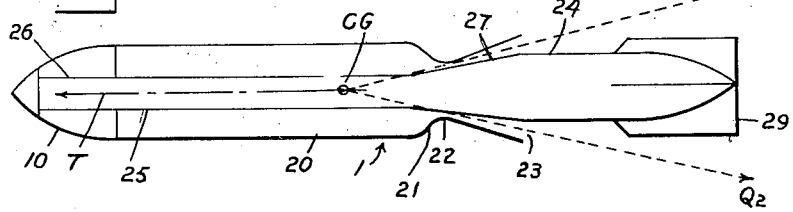
Inventor
Clarence N. Hickman

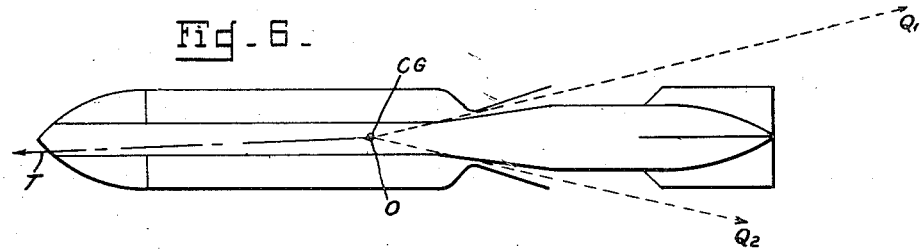
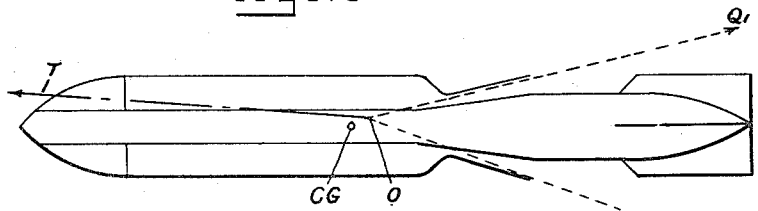
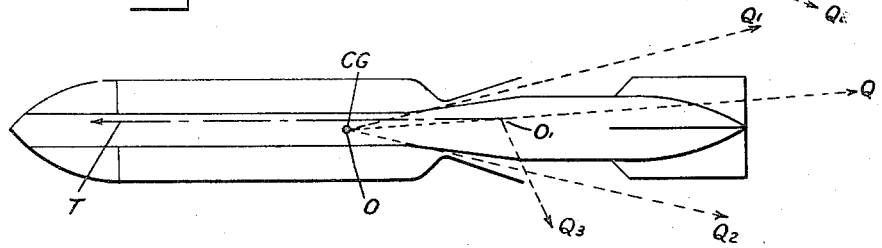
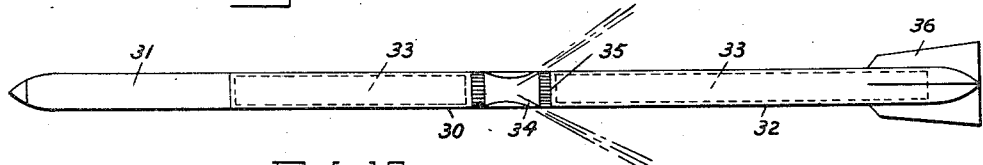
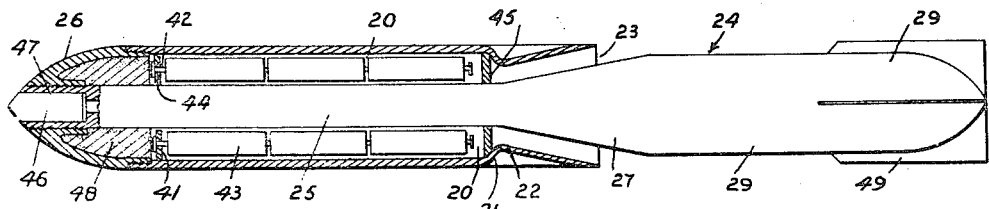

Patented Apr. 11, 1950

2,503,271

UNITED STATES PATENT OFFICE 2,503,271

ROCKET PROJECTILE

Clarence N. Hickman, Jackson Heights, N. Y.

Application February 6, 1945, Serial No. 576,439

5 Claims. (Cl. 102—49)

(Granted under the act of March 3, 1883, as amended April 30, 1928; 370 O. G. 757)

The invention described herein may be manufactured and used by or for the Government for governmental purposes without the payment to me of any royalty thereon.

This invention relates to jet propulsion, and more particularly to jet propelled devices utilized in warfare.

Jet propulsion of relatively heavy missiles at high velocities has recently acquired a new importance in warfare primarily because the successful development of suitable rockets has made it possible to exploit their inherent advantages of absence of recoil and lightness, simplicity and cheapness of rocket projectors as compared with guns. Rocket propulsion has also been adapted for military use in specific instances because the projectors and rockets are light and readily portable and can be readily transported and set up at points to which guns of comparable caliber and effects could not be transported or set up. Because of its increasing importance in warfare, extensive research has been undertaken to develop rocket designs suitable for various military applications for which guns of equivalent caliber are not suitable or unavailable. This invention offers certain basic improvements in construction over the rockets already developed as a result of these researches.

The dispersion encountered in jet propelled devices of the rocket classification is greater than that encountered in a projectile fired from a gun, but since a gun of comparable caliber and effects cannot be made available or adapted to some of these specific applications, and since a rocket can be used, it becomes an object of this invention to provide an improved rocket design in which the deviation of the rocket from its desired and predicted trajectory is greatly reduced.

Research has established that the dispersion produced in a rocket in which thrust is exerted after the rocket has left its projector is due in part to either or both of the following: first, non-symmetry of construction, i. e., a construction in which the center of gravity of the rocket is off the axis of symmetry; second, non-symmetry of jet action, wherein the resultant action of the jet (i. e. the integral of thrust over a surface normal to the thrust axis) is at an angle to the axis of the rocket and its line of action is displaced from the center of gravity.

In either of the above conditions the integrated resultant thrust has a component normal to a line through the designed center of thrust and the center of gravity. This component is frequently sufficient in magnitude to cause the rocket to turn about a transverse axis through a point at or near its center of gravity even though the line of the resultant thrust passes close to the center of gravity. That these component forces are sufficient to produce rotation is due primarily to the fact that the moment arm of these components is large if the rocket is designed with its center of gravity displaced from the designed center of thrust as is the case when the jet is at the nose or rear. Once the rocket has turned to a new direction of flight as a result of these component forces, the jet action will then tend to propel the rocket in its new direction; consequently, the turning moment continues throughout the free flight burning and the resulting dispersions are large.

It has been the practice in the prior art to design rockets so that the jet action takes place either near the tail or near the nose of the body of the rocket. In either design the calculated center of thrust will be displaced from the center of gravity.

It is an object of this invention to provide a rocket design which has a resultant jet action near the center of gravity of the rocket so that the resultant thrust produced by the jet action will act through a point near the center of gravity irrespective of unsymmetrical jet action.

It is a further object of this invention to reduce the turning moment tending to produce rotation of the rocket about its center of gravity by reducing the moment arm of the turning component of the resultant thrust.

It is a still further object of this invention to provide a rocket in which the designed center of thrust is substantially coincident with the center of gravity.

Another object of this invention is to provide in a rocket means for adjusting the throat area to compensate for the changes in burning rate of the propellant as caused, for example, by temperature variations thereof.

Further and more specific objects and advantages of this invention will clearly appear from the following description of certain preferred embodiments shown in the accompanying drawings in which:

Fig. 1 illustrates diagrammatically a recent development in rockets showing the design positions of center of thrust, center of gravity, and resultant direction of thrust.

Figs. 2 and 3 illustrate diagrammatically the change in position of the resultant direction of thrust relative to the center of gravity for the rocket of Fig. 1 as produced by unsymmetrical jet action.

Fig. 4 illustrates diagrammatically the change in position of the resultant direction of thrust relative to the center of gravity for the rocket of Fig. 1 as caused by eddies in the jet.

Fig. 5 illustrates diagrammatically a rocket constructed in accordance with the invention, showing the assumed position of the designed center of thrust, center of gravity, and resultant direction of thrust for uniform or symmetrical jet action.

Fig. 6 illustrates diagrammatically the effect of an unsymmetrical jet action for the rocket of Fig. 5 when the center of thrust coincides with the center of gravity.

Fig. 7 illustrates diagrammatically the effect of an unsymmetrical jet action on the rocket of Fig. 5, showing a slight shift in the center of thrust.

Fig. 8 illustrates diagrammatically the effect of eddies on the rocket design of Fig. 5.

Fig. 9 is an elevational view in cross-section showing the details of the rocket illustrated diagrammatically in Fig. 5.

Fig. 10 is an elevational view in cross-section of a modification wherein the pay-load is carried in the rocket head.

The dispersion produced by nonsymmetry of design can be easily reduced by precision in the manufacture, therefore it is assumed that the center of gravity falls along the axis of symmetry of the rocket and that the factor causing the dispersion is unsymmetrical jet action. Actually this assumption is not far from actual facts since experiments have clearly demonstrated that most of the dispersion observed with rockets in which the thrust is continued after they leave the guide tube or other projector is due to unsymmetrical jet action. Therefore, it is proposed in this invention to compensate for the dispersion produced by nonsymmetry of design by care in the manufacture so as to cause the center of gravity to fall substantially along the axis. In other words, it is proposed to compensate for dispersion due to nonsymmetry by avoiding nonsymmetry in manufacture. Since it is known that eddy currents destroy the symmetry of the jet, and further since eddies cannot be prevented without difficulties the second factor causing dispersion cannot be removed. Therefore unsymmetrical jet action must be reckoned with and the design of the rocket must be such that the nonsymmetrical jet action will produce the least possible dispersion.

One form of rocket is illustrated diagrammatically in Fig. 1. Although the rocket illustrated has low dispersion characteristics, it is nevertheless proposed in this invention to offer a design which will further reduce dispersion thus increasing the effectiveness of this weapon.

As shown in Fig. 1, there is provided a housing 1 secured at its forward end to a hollow rocket head 10 adapted to contain a high explosive. A burster tube 11 is provided communicating with head 10 and extending down into the body of a combustion chamber 12 for the propellant defined by housing 1. The rearward end of the housing 1 is shaped to define a Venturi nozzle 13 permitting high velocity exit of the gases generated by the combustion of the propellant adapted to be contained within the combustion chamber 12.

In Fig. 1 it is assumed that the center of gravity (CG) is on the axis of the rocket and that the jet action is symmetrical. Considering a cross section of the rocket and jet, it is assumed that the resultant direction of all the gas particles for the upper half of the nozzle is shown by the vector $OQ_1$ and that $Q_1$, its length, represents the quantity of motion of the gas moving in the direction $O—Q_1$. It is also assumed that an equal quantity of motion of the gas $Q_2$ has a direction $(O—Q_2)$ represented by the vector $OQ_2$. The resultant thrust produced by the momentums $Q_1$ and $Q_2$ acting in the directions $O—Q_1$ and $O—Q_2$ respectively is represented by the vector $OT$ having a magnitude $T$. Under these conditions the rocket will fly true and the point $O$ will be regarded as the designed center of thrust since it is that point from which the resultant thrust vector is assumed to act. It should be clear that if the center of gravity were off the axis there would be a turning moment about the center of gravity because the resultant thrust vector $T$ would have a propelling component through the center of gravity and a turning component normal thereto having a moment arm equal to $CG—O$. However, it was assumed at the outset that the center of gravity may be kept near the axis and that unsymmetrical jet action would be regarded as the principal cause of dispersion.

Assume now that as shown in Fig. 2 the quantity of motion of gas $Q_1$ having a resultant direction $O—Q_1$ is greater than the quantity of motion of gas $Q_2$ having a resultant direction $O—Q_2$. Under these conditions the resultant thrust $T$ will have a direction $O—T$ below the center of gravity $CG$ and out of line with the axis of symmetry of the rocket. There will now be a turning moment proportional to the amount the line of thrust misses the center of gravity. The vector $OT$ is resolved into a propelling component along the axis through the center of gravity and a turning component normal to the axis acting through the point $O$. The moment arm of the turning component is of a length $O—CG$. The line of flight of the rocket will thus be determined by the amount the rocket turns and the quantity of motion of gas ejected after turning.

The rocket diagrammatically illustrated by Fig. 1 is about 33 inches long having its center of gravity 15 inches from the nose. The total included angle of the nozzle is 18 degrees and the throat diameter is 1.84 inches. The nozzle is 2.8 inches long. These dimensions are set forth since they establish the calculated or designed center of thrust. In the design shown the point $O$ would be located about 10 inches behind the center of gravity $CG$. For a particular rocket, with a particular fin structure, it has been demonstrated by experiment and established by computation that there is an angular dispersion of one mil for each .001 inch the center of gravity is off the line of thrust. If the line of thrust is off the axis of the rocket by an angle of one mil (assuming that the center of gravity of the rocket is on the axis) the line of thrust will miss the center of gravity .010 inch and will therefore result in a deviation of 10 mils for each mil the thrust is out of line with the axis. Since in manufacture these precisions are of like order, it may be stated that with equal precision in manufacture and for the particular rocket design illustrated, the dispersions resulting from an unsymmetrical jet is tenfold that resulting from nonsymmetry caused by the position of the center of gravity being off the axis.

It has been shown in test that conditions exaggerating those shown in Fig. 2 may be produced by utilizing powders of different burning rates on opposite sides of the bursting tube 11 to produce a difference in the quantity of gas ejected on opposite sides of the nozzle. Powders with different burning rates have produced deviations of 150 mils to the right or left depending upon the orientation of the rocket in the launching tube.

If, as shown diagrammatically in Fig. 3, the entrance portion to the throat is unsymmetrical, the mass-rate of gas $Q_2$ ejected along the direction $O$—$Q_2$ will be greater than the mass-rate gas $Q_1$ ejected along the direction $O$—$Q_1$. The resultant thrust T will be above the center of gravity (CG) and the rocket will turn badly.

As shown diagrammatically in Fig. 4, eddy currents produced at the mouth of the nozzle may cause a quantity of movement of gas $Q_2$ to go off at a wide angle relative to the axis of the rocket causing the resultant thrust T to be above the center of gravity.

It should be apparent from the above that one reason unsymmetrical jet action causes so much dispersion is due to the jet force or designed center of thrust being so far behind the center of gravity. Any small angular variation in the direction the jet is pointed will cause the resultant thrust to be greatly off the center of gravity.

While it is proposed in this invention to reduce dispersion by a design of rocket having the jet positioned near the center of gravity, the invention is not limited specifically to this means, since the deviation produced by unsymmetrical jet action may be improved by other means for bringing the designed center of thrust closer to the center of gravity. For example, this may be accomplished by using a small nozzle angle or by using a straight cylindrical section secured to the flared end of the nozzle. However, since it may not be practical to reduce the nozzle angle sufficiently to place the point O at the center of gravity, it is proposed in the rocket construction of this invention to locate the jet at a point on the body of the rocket wherein the reactions are principally through the center of gravity regardless of symmetry.

A design of rocket accomplishing the result is shown in Fig. 5. As illustrated, the rocket body comprises a housing 1 defining generally a cylindrical combustion chamber 20, having a forwardly flared entrance 21 leading to a constricted throat portion 22 which is provided with a rearwardly flared exit 23 leading therefrom. A pay load head 10 is secured to the forward end of housing 1. A casing 24 adapted to contain a useful load, such as a high explosive, is provided communicating with head 10 and extending entirely through housing 1, and, as illustrated, includes a forward cylindrical portion 25 of uniform diameter smaller than the diameter of throat 22 extending within the combustion chamber 20 and secured thereto by a nose portion 26. The intermediate portion of the casing lying adjacent exit portion 23 is flared rearwardly to form a frusto-conical section 27 of diameters increasingly larger than the diameter of the cylindrical portion 25 thereby defining an annular discharge nozzle in cooperation with housing 1. The rearward portion of the chamber is of uniform diameter over a portion of its length and is streamlined rearwardly throughout the region to which fins 29 are secured.

If, as for Fig. 1, we assume that the quantity movement of gas $Q_1$ is equal to the quantity of movement of gas $Q_2$, the resultant thrust T will coincide with the axis and therefore pass through the center of gravity CG. In this case as before there will be no turning moment on the rocket.

If, on the other hand as shown diagrammatically in Fig. 6, the quantity of movement of gas $Q_1$ is greater than the quantity of movement of gas $Q_2$ the resultant thrust T will be displaced from coincidence with the axis. However in this case, contrary to Fig. 2, there will be no turning moment on the rocket because the line of thrust passes through the center of gravity. There will, therefore, be no deviation except that due to the small component of force. As previously explained this is small when compared to the dispersion resulting from a turning of the rocket about its center of gravity.

As is shown in Fig. 7, the directions and quantities of motion of the gas $Q_1$ and $Q_2$ are such that the resultant thrust T will be off the axis and will miss the center of gravity (CG). However, the amount that the line of thrust misses the center of gravity will be much less than for the rocket of a design shown in Fig. 3. The turning moment of this rocket will therefore be greatly reduced and the resultant dispersion will be made much smaller. Since the jet is making an appreciable angle with the axis, the variations in its direction will have much less effect in moving the point O away from the center of gravity than is the case with the design shown in Figs. 1 to 4. This is true even in a design where the nozzle angle is so small that the point O will be located at the center of gravity with a symmetrical jet.

Fig. 8 shows diagrammatically the condition that exists in the improved design when eddy currents produce a component of gas $Q_3$ that exits from the nozzle at a wide angle. The resultant thrust T will be out of line with the axis of the rocket and the line of thrust will also miss the center of gravity. However, due to the fact that the rocket is constructed so as to place the designed center of thrust at the center of gravity CG the turning component will be greatly reduced.

The particular advantages to be gained in the new and improved rocket of this invention may better appear by considering Fig. 9. In order to attain high altitude a considerable amount of propellant 33 is utilized. Thus for good aerodynamic design a long rocket body 30 is required. The high explosive is contained within forward portion 31. If the gases were ejected from a nozzle located in the tail, the moment arm for any lateral components would be exceedingly large and the dispersion would be excessive. To avoid this difficulty it is proposed by this invention to locate a nozzle 34 intermediate the ends of the propellent chamber. Grids 35 are provided at each end of the nozzle to retain the propellant. Stability is provided by fins 36 secured to the tail of a propellent combustion chamber 32. This design has a further advantage in that it reduces the tunnel length the gas has to travel with a reduction in the differential pressure between the front and rear ends of each propellent grain.

In Figs. 10 there is shown more in detail the elements of the design shown diagrammatically in Fig. 5. The outer jacket 20 forms a combustion chamber which has a forwardly flared portion 21 formed at one end leading to the throat 22 of a rearwardly flared exit passage 23. The forward end of the combustion chamber contains a trap plate 41 into which trap wires 42 are each secured. Axially perforated powder grains 43 are strung on each trap wire and retained in place about the periphery of the trap plate which has a central opening 44 formed therein adapted to receive the forward cylindrical portion 25 of the casing 24. The end of this cylindrical portion 25 of the casing 24 is threaded on to a nose 26 which is in turn threaded to the combustion chamber 20. The end of 25 is recessed as shown at 47 to contain a suitable fuse 46 for detonating the high explosive within the casing 24. A guide 45 comprising a star-shaped disc locates and supports the rearward portion of the cylindrical casing within the combustion chamber 20. The casing 24 includes in addition to the forward cylindrical portion 25 of small diameter, an intermediate frusto-conical portion 27 of diameters increasingly larger than the diameter of portion 25 and a rear cylindrical portion 29 of larger diameter. An annular nozzle is thus defined between portion 27 of casing 24 and flared passage 23 of chamber 20. Thus the effective ring throat area may be adjusted by controlling the distance the casing is inserted in the combustion chamber. Fixed fins 49 are provided at the rear streamlined portion of the casing. A black powder primer 48 is provided to ignite the propellant.

It may appear desirable to place tilted vanes in the nozzle to produce rotation. This rotation would tend to even out any remaining variations due to the jet thrust being out of line with the center of gravity.

It will be obvious that various changes might be made in the construction, combination and arrangement of parts, which could be used without departing from the spirit of this invention, and it is to be expressly understood that the foregoing is set forth for the purpose of illustration and not for the purpose of limitation.

I claim:

1. A jet propelled device comprising in combination a casing symmetrical to a longitudinal axis having a forward cylindrical portion of uniform diameter and a rearward frusto-conical portion of diameters increasingly larger than the diameter of said cylindrical portion, a cylindrical combustion chamber having a forwardly flared entrance and a rearwardly flared exit passage formed in an open end thereof to provide a constricted throat of a Venturi-like nozzle, means supporting a plurality of cylindrical powder grains symmetrically about the axis of said chamber, each of said grains having an axial perforation substantially parallel to the axis of said chamber, and spaced radially from said axis at a distance greater than the radius of the cylindrical portion of said casing whereby the cylindrical portion of said casing may be inserted through the nozzle to within said chamber to provide a support for said chamber, means securing said chamber to the cylindrical portion of said casing whereby the frustro-conical portion of said casing will be within the rearwardly flared portion of said exit passage, said securing means including means for adjusting the position of said conical portion within said nozzle to vary the throat area thereof whereby to compensate for changes in burning rate caused by temperature variations of said powder.

2. The combination defined in claim 1 characterized further by the fact that said casing contains a high explosive whereby said chamber will be fragmented upon detonation of the high explosive contained within the forward cylindrical portion thereof.

3. In a jet propelled missile, a cylindrical jacket having a central longitudinal axis, and a Venturi nozzle at its rear end, a casing comprising forward and rear cylindrical sections connected by a frusto-conical section, said forward section being of smaller diameter than said rear section, and means rigidly connecting said casing and jacket with said forward section in and coaxial of said jacket to form a combustion chamber between said jacket and forward section, and with said frusto-conical section within said nozzle, said casing being adjustable along said axis to vary the effective area of the exit passage between said nozzle and frusto-conical section.

4. A missile as recited in claim 3, the forward end of said jacket being closed by a nose, said forward cylindrical section being threaded into said nose.

5. A missile as recited in claim 3, a propellant mounted in said annular chamber, the center of gravity of said missile being on said central axis and substantially coincident with the center of thrust of the gases emerging from said passage as a result of combustion of said propellant.

CLARENCE N. HICKMAN.

REFERENCES CITED

The following references are of record in the file of this patent:

UNITED STATES PATENTS

| Number | Name | Date |
| --- | --- | --- |
| 2,145,508 | Denoix | Jan. 31, 1939 |

FOREIGN PATENTS

| Number | Country | Date |
| --- | --- | --- |
| 11,705 | France | Oct. 5, 1844 |
| 126,325 | Great Britain | May 15, 1919 |
| 516,818 | Great Britain | Jan. 12, 1940 |
| 516,865 | Great Britain | Jan. 12, 1940 |